United States Patent

Robinson et al.

Patent Number: 6,124,207
Date of Patent: Sep. 26, 2000

[54] SLURRIES FOR MECHANICAL OR CHEMICAL-MECHANICAL PLANARIZATION OF MICROELECTRONIC-DEVICE SUBSTRATE ASSEMBLIES, AND METHODS AND APPARATUSES FOR MAKING AND USING SUCH SLURRIES

[75] Inventors: Karl M. Robinson; Michael Andreas, both of Boise, Id.

[73] Assignee: Micron Technology, Inc., Boise, Id.

[21] Appl. No.: 09/144,536

[22] Filed: Aug. 31, 1998

[51] Int. Cl.[7] .................................................. H01L 21/306
[52] U.S. Cl. ......................... 438/692; 438/693; 438/745; 438/746; 438/747
[58] Field of Search .............................. 438/693, 14, 692, 438/691, 698, 745, 746, 747, 694; 51/307

[56] References Cited

U.S. PATENT DOCUMENTS

| | | | |
|---|---|---|---|
| 5,245,790 | 9/1993 | Jerbic | 45/159 |
| 5,302,368 | 4/1994 | Harato et al. | 423/625 |
| 5,399,234 | 3/1995 | Yu et al. | 438/14 |
| 5,407,526 | 4/1995 | Danielson et al. | 438/693 |
| 5,527,423 | 6/1996 | Neville et al. | 438/693 |
| 5,531,861 | 7/1996 | Yu et al. | 438/693 |
| 5,688,364 | 11/1997 | Sato | 438/693 |
| 5,697,992 | 12/1997 | Ueda et al. | 51/307 |
| 5,895,550 | 4/1999 | Andreas | 156/345 |

*Primary Examiner*—Benjamin L. Utech
*Assistant Examiner*—Binh X. Tran
*Attorney, Agent, or Firm*—Perkins Coie LLP

[57] ABSTRACT

Slurries used in the manufacturing of microelectronic devices, and apparatuses and methods for making and using such slurries. In one aspect of the invention, a planarizing slurry for planarizing a microelectronic-device substrate assembly is made by fracturing agglomerations of abrasive particles in a first slurry component into smaller agglomerations of abrasive particles or individual abrasive particles. The first slurry component can include water and the abrasive particles. The agglomerations of abrasive particles can be fractured into smaller units by imparting energy to the first slurry component before the first slurry component is mixed with a second slurry component. The agglomerations of abrasive particles are preferably fractured by imparting sonic energy to the first slurry component before it is mixed with the second slurry component. The agglomerations of abrasive particles in the first slurry component may also be fractured by ball milling or highly turbulent pumping. After fracturing the agglomerations of abrasive particles into smaller units, the first slurry component is mixed with the second slurry component. Another aspect of the invention is inhibiting re-agglomeration of the abrasive particles after mixing the first and second slurry components.

36 Claims, 5 Drawing Sheets

SLURRIES FOR MECHANICAL OR CHEMICAL-MECHANICAL PLANARIZATION OF MICROELECTRONIC-DEVICE SUBSTRATE ASSEMBLIES, AND METHODS AND APPARATUSES FOR MAKING AND USING SUCH SLURRIES

TECHNICAL FIELD

The present invention relates to slurries for planarizing microelectronic-device substrate assemblies, and to methods and apparatuses for making and using such slurries in mechanical and/or chemical-mechanical planarization processes.

BACKGROUND OF THE INVENTION

Mechanical and chemical-mechanical planarizing processes (collectively "CMP") are used in the manufacturing of electronic devices for forming a flat surface on semiconductor wafers, field emission displays and many other microelectronic-device substrate assemblies. CMP processes generally remove material from a substrate assembly to create a highly planar surface at a precise elevation in the layers of material on the substrate assembly.

FIG. 1 schematically illustrates an existing web-format planarizing machine 10 for planarizing a substrate 12. The planarizing machine 10 has a support table 14 with a top-panel 16 at a workstation where an operative portion (A) of a planarizing pad 40 is positioned. The top-panel 16 is generally a rigid plate to provide a flat, solid surface to which a particular section of the planarizing pad 40 may be secured during planarization.

The planarizing machine 10 also has a plurality of rollers to guide, position and hold the planarizing pad 40 over the top-panel 16. The rollers include a supply roller 20, first and second idler rollers 21a and 21b, first and second guide rollers 22a and 22b, and a take-up roller 23. The supply roller 20 carries an unused or pre-operative portion of the planarizing pad 40, and the take-up roller 23 carries a used or post-operative portion of the planarizing pad 40. Additionally, the first idler roller 21a and the first guide roller 22a stretch the planarizing pad 40 over the top-panel 16 to hold the planarizing pad 40 stationary during operation. A motor (not shown) drives at least one of the supply roller 20 and the take-up roller 23 to sequentially advance the planarizing pad 40 across the top-panel 16. As such, clean pre-operative sections of the planarizing pad 40 may be quickly substituted for used sections to provide a consistent surface for planarizing and/or cleaning the substrate 12.

The web-format planarizing machine 10 also has a carrier assembly 30 that controls and protects the substrate 12 during planarization. The carrier assembly 30 generally has a substrate holder 32 to pick up, hold and release the substrate 12 at appropriate stages of the planarizing cycle. A plurality of nozzles 33 attached to the substrate holder 32 dispense a planarizing solution 44 onto a planarizing surface 42 of the planarizing pad 40. The carrier assembly 30 also generally has a support gantry 34 carrying a drive assembly 35 that translates along the gantry 34. The drive assembly 35 generally has an actuator 36, a drive shaft 37 coupled to the actuator 36, and an arm 38 projecting from the drive shaft 37. The arm 38 carries the substrate holder 32 via another shaft 39 such that the drive assembly 35 orbits the substrate holder 32 about an axis B—B offset from a center point C—C the substrate 12.

The planarizing pad 40 and the planarizing solution 44 define a planarizing medium that mechanically and/or chemically-mechanically removes material from the surface of the substrate 12. The web-format planarizing machine 10 typically uses a fixed-abrasive planarizing pad in which abrasive particles are fixedly bonded to a suspension material. In fixed-abrasive applications, the planarizing solution is generally a "clean solution" without abrasive particles because the abrasive particles are fixedly distributed across the planarizing surface 42 of the planarizing pad 40. In other applications, the planarizing pad 40 may be a non-abrasive pad composed of a polymeric material (e.g., polyurethane), a resin, or other suitable materials without abrasive particles. The planarizing solutions 44 used with the non-abrasive planarizing pads are typically CMP slurries with abrasive particles and chemicals to remove material from a substrate.

To planarize the substrate 12 with the planarizing machine 10, the carrier assembly 30 presses the substrate 12 against the planarizing surface 42 of the planarizing pad 40 in the presence of the planarizing solution 44. The drive assembly 35 then orbits the substrate holder 32 about the offset axis B—B to translate the substrate 12 across the planarizing surface 42. As a result, the abrasive particles and/or the chemicals in the planarizing medium remove material from the surface of the substrate 12.

CMP processes should consistently and accurately produce a uniformly planar surface on the substrate assembly to enable precise fabrication of circuits and photo-patterns. During the fabrication of transistors, contacts, interconnects and other components, many substrate assemblies develop large "step heights" that create a highly topographic surface across the substrate assembly. To enable the fabrication of integrated circuits with high densities of components, it is necessary to produce a highly planar substrate surface at several stages of processing the substrate assembly because non-planar substrate surfaces significantly increase the difficulty of forming sub-micron features. For example, it is difficult to accurately focus photo-patterns to within tolerances approaching 0.1 $\mu$m on non-planar substrate surfaces because sub-micron photolithographic equipment generally has a very limited depth of field. Thus, CMP processes are often used to transform a topographical substrate surface into a highly uniform, planar substrate surface.

In the competitive semiconductor industry, it is also highly desirable to have a high yield in CMP processes by quickly producing a uniformly planar surface at a desired endpoint on a substrate assembly. For example, when a conductive layer on a substrate assembly is under-planarized in the formation of contacts or interconnects, many of these components may not be electrically isolated from one another because undesirable portions of the conductive layer may remain on the substrate assembly over a dielectric layer. Additionally, when a substrate assembly is over planarized, components below the desired endpoint may be damaged or completely destroyed. Thus, to provide a high yield of operable microelectronic devices, CMP processing should quickly remove material until the desired endpoint is reached.

To accurately create highly planar substrate surfaces at the desired endpoint, the particle size distribution of planarizing slurries with abrasive particles should: (1) be consistent from one batch of slurry to another; and (2) have small particle sizes. For example, many slurries have abrasive particles with individual particle sizes of approximately 10–250 nm. One problem with CMP processing, however, is that individual abrasive particles may agglomerate into larger abrasive elements that have a plurality of abrasive particles. The formation of such abrasive elements affects the consistency of the slurry because the extent that the particles agglomerate varies from one batch of slurry to another, or even within a single batch of slurry. Additionally, large abrasive elements may scratch the wafer and produce defects, or even smaller abrasive elements may effectively increase the particle size distribution of the slurry. Thus, the agglomeration of abrasive particles into larger abrasive elements is a serious problem for fabricating very small electronic components with CMP processes.

One existing technique to reduce agglomerations of abrasive particles is to select abrasive particles that repel each other. For example, aluminum oxide particles have a sufficient electrical charge at the pH levels of most slurries to substantially repel one another and prevent the particles from agglomerating. Ceria oxide (ceria) particles, on the other hand, do not inherently repel one another because they are generally isoelectric at the pH levels of most ceria based slurries. Accordingly, another technique to reduce agglomerations of abrasive particles is to add a dispersant to the slurry that prevents the ceria particles from agglomerating with one another. A typical dispersant covers the ceria particles with a compound that prevents individual particles or agglomerations of particles from becoming attached together. Although using appropriately charged particles and/or dispersants reduces agglomerations of abrasive particles in slurries, many slurries still suffer from the formation of a large number of agglomerations that increase the particle size distribution of the slurries.

In light of the problems of maintaining a consistent distribution of small abrasive particles and abrasive elements in the slurries, slurries are generally transported to the device manufacturers in two separate components. The first slurry component typically includes water and the abrasive particles. The second slurry component typically includes a liquid and other chemicals, such as surfactants, dispersants, oxidants, etc. The device manufacturers generally mix the first and second slurry components together to form a batch of slurry within forty-eight hours of using the slurry in a planarizing machine.

Although mixing the abrasive particles with the other slurry components shortly before using the slurry reduces agglomerations of abrasive particles, many intermediate and large agglomerations of abrasive particles still form in the mixed batches of slurry prior to being used in the planarization machines. Thus, merely mixing the first and second slurry components together to form a batch of slurry shortly before using the slurry does not alleviate the problems associated with agglomerations of abrasive particles.

One method to reduce the agglomerations of abrasive particles in a slurry is to impart sonic energy to the first and second slurry components after they have been mixed together. By sonicating both the first and second slurry components of the mixed slurry just before the mixed slurry is deposited onto the polishing pad, the sonic energy breaks apart the abrasive elements to reduce the particle size distribution of the slurry. Although sonicating the mixed slurry as it flows to the planarizing tool reduces the particle size distribution in several applications, the sonic energy often does not separate agglomerated abrasive particles in slurries containing a dispersant because the dispersant encapsulates and protects the abrasive elements as the first and second slurry components are mixed together prior to sonicating the mixed slurry. Thus, even sonicating a slurry mixture just before it flows to the planarizing machine may not effectively break apart the abrasive elements.

SUMMARY OF THE INVENTION

The present invention is directed toward planarizing slurries used in the manufacturing of microelectronic devices, and apparatuses and methods for making and using such slurries. In one aspect of the invention, a planarizing slurry for planarizing a microelectronic-device substrate assembly is made by fracturing agglomerations of abrasive particles in a first solution including water and the abrasive particles (e.g., a first slurry component). The agglomerations of abrasive particles can be fractured into smaller agglomerations or individual abrasive particles by imparting energy to the first solution before the first solution is mixed with a second solution (e.g., a second slurry component). After fracturing the agglomerations of abrasive particles into smaller units, the first solution is mixed with the second solution to form a mixed planarizing slurry that is ready to planarize the substrate assembly. Another aspect of the invention is inhibiting re-agglomeration of the abrasive particles after mixing the first and second solutions together.

The agglomerations of abrasive particles are preferably fractured by imparting sonic energy to the first solution before it is mixed with the second solution. The agglomerations of abrasive particles in the first solution may also be fractured by ball milling or turbulent pumping.

In another aspect of the invention, a microelectronic-device substrate assembly may be planarized using a slurry in which the agglomerations of abrasive particles in the first slurry component are fractured before the first slurry component is mixed with the second slurry component to make the mixed planarizing slurry. The method continues by dispensing the mixed slurry onto a planarizing surface of a planarizing pad, and then pressing the substrate assembly against the planarizing surface while moving at least one of the substrate assembly and the planarizing pad.

In still another aspect of the invention, a system for planarizing a microelectronic-device substrate assembly includes a table having a support panel, a planarizing pad attached to the support panel, and a carrier assembly having a substrate holder to hold, press and move the substrate assembly across the planarizing pad. The planarizing system can also include a supply of the first slurry component, a sonic transducer coupled to the supply of the first slurry component, and a separate supply of the second slurry component. The sonic transducer imparts sonic energy to a flow of the first slurry component prior to mixing the first slurry component with the second slurry component in a mixing tank. The mixing tank is operatively coupled to a slurry dispenser positioned over the planarizing pad to dispense the mixed slurry onto the pad during planarization of a substrate assembly.

DETAILED DESCRIPTION OF THE INVENTION

The present invention is directed toward planarizing systems, slurries and methods for mechanical and/or chemical-mechanical planarization of substrate assemblies used in the manufacturing of microelectronic devices. Many specific details of certain embodiments of the invention are set forth in the following description, and in FIGS. 2–5B, to provide a thorough understanding of such embodiments. One skilled in the art, however, will understand that the present invention may have additional embodiments, or that the invention may be practiced without several of the details described in the following description.

Figure 1:
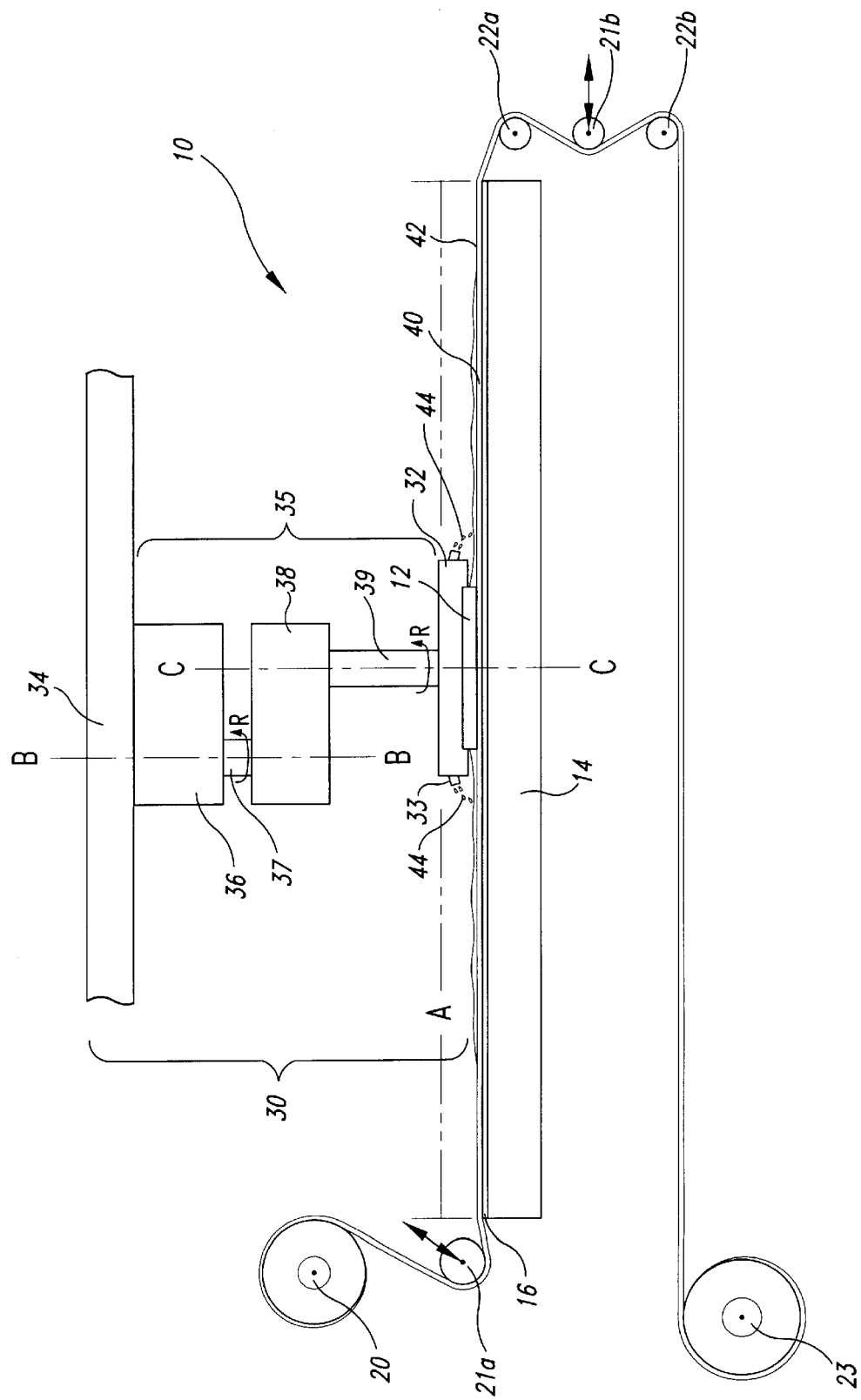
FIG. 1 is a schematic side view of a web-format planarizing machine in accordance with the prior art.
Figure 2:
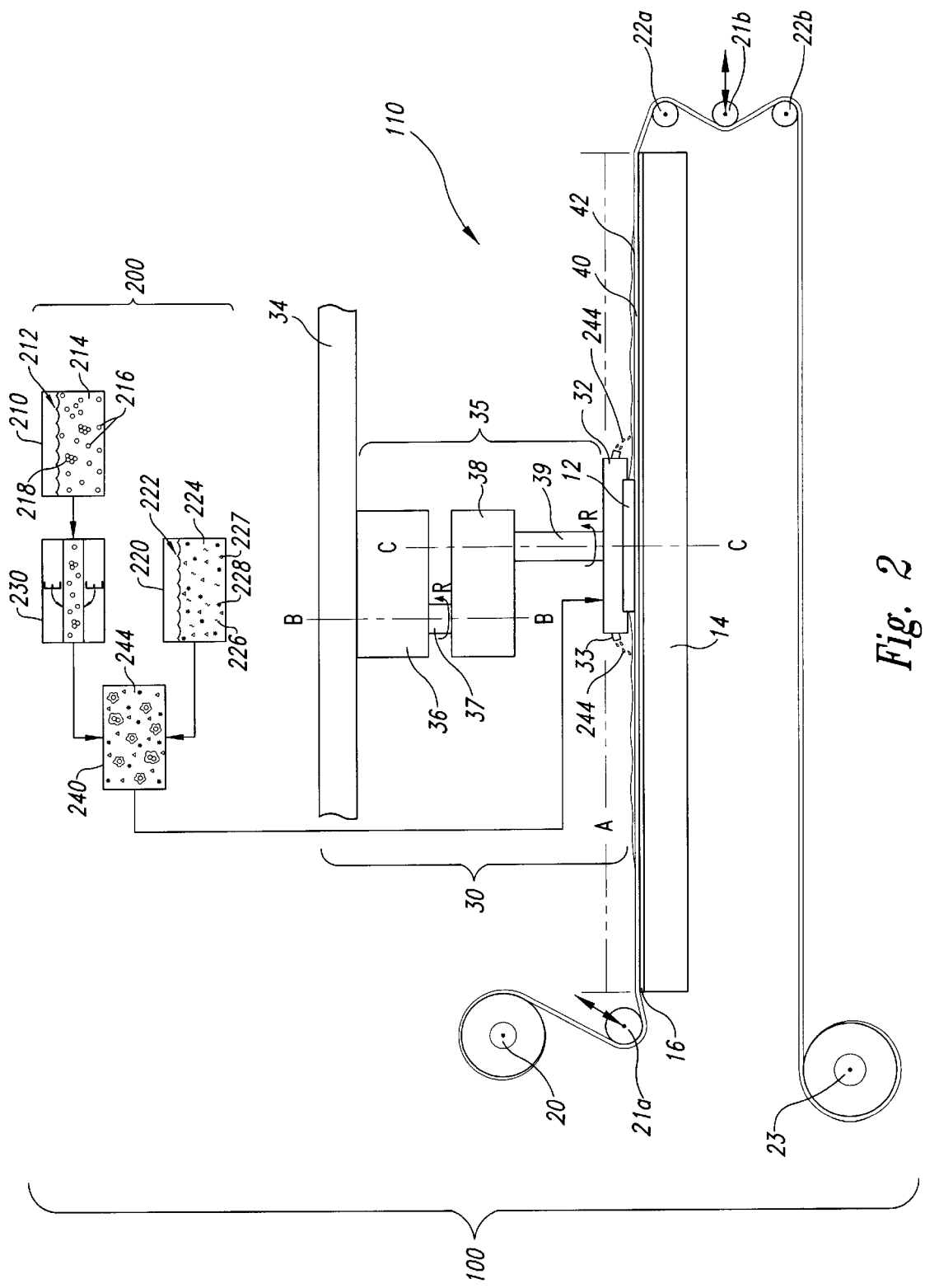
FIG. 2 is a schematic side view of a planarizing system including a planarizing machine and a slurry manufacturing assembly in accordance with one embodiment of the invention.

FIG. 2 is a schematic view illustrating a planarizing system 100 having a planarizing machine 110 and a slurry manufacturing assembly 200 in accordance with one embodiment of the invention. The planarizing machine 110 15 shown in FIG. 2 is similar to the web-format planarizing machine 10 described above with reference to FIG. 1, and thus like reference numbers refer to like parts. The planarizing machine 110 could also be a rotary planarizing machine having a rotating platen and a circular polishing pad as set forth in U.S. Pat. Nos. 5,645,682 and 5,792,709, which are herein incorporated by reference. Suitable web-format planarizing machines are manufactured by Obsidian Corporation, and suitable rotary planarizing machines are manufactured by Westec Corporation and Strausbaugh Corporation.

The slurry manufacturing assembly 200 generally includes a first supply container 210 of a first solution 212 and a second supply container 220 of a second solution 222. The slurry manufacturing assembly 200 also preferably includes an energy device 230 coupled to the first container 210, and a mixing tank 240 coupled to the second container 220 and the energy device 230. The first solution 212 flows from the first container 210 through the energy device 230 and into the mixing tank 240. As explained below, the energy device 230 breaks apart agglomerations of particles in the first solution 212. The second solution 222 flows directly from the second container 220 to the mixing tank 240. The first and second solutions 212 and 222 are mixed together in the mixing tank 240 to form a mixed slurry 244 that is coupled to the nozzles 33 of the planarizing machine 110.

The first solution 212 defines a first slurry component of the mixed slurry 244. The first solution 212 preferably includes water and a plurality of abrasive particles 216 in the water 214. The abrasive particles 216 can be aluminum oxide particles, ceria particles, silicon dioxide particles, titanium oxide particles, tantalum oxide particles or other suitable abrasive particles for removing material from microelectronic device substrate assemblies. The abrasive particles 216 are preferably small particles with particle sizes from 5–250 nm, and more preferably from 5–50 nm. In other applications, the abrasive particles 216 have particle sizes up to 500 nm. When the first solution 212 is in the first container 210 prior to being mixed with the second solution 222, many of the abrasive particles 216 in the first solution 212 may agglomerate to form larger abrasive elements 218 that include two or more individual abrasive particles 216. The individual abrasive particles 216 in the abrasive elements 218 are generally bonded together electronically, covalently, or by van der waals interaction.

The second solution 222 defines a second component of the mixed slurry 244. The second solution 222 generally includes a liquid 224 and a plurality of additives. The additives can be a dispersant 226, an oxidant 227, a surfactant 228 or other desirable additives for planarizing slurries. It will be appreciated that the dispersant 226, oxidant 227 and surfactant 228 shown in FIG. 2 are represented graphically, but they may be either solids, liquids or colloidal components of the second solution 222. The second solution 222 is mixed with the first solution 212 to form the mixed slurry 244 after the first solution 212 passes through the energy device 230 to separately process the first solution 212.

Figure 3:
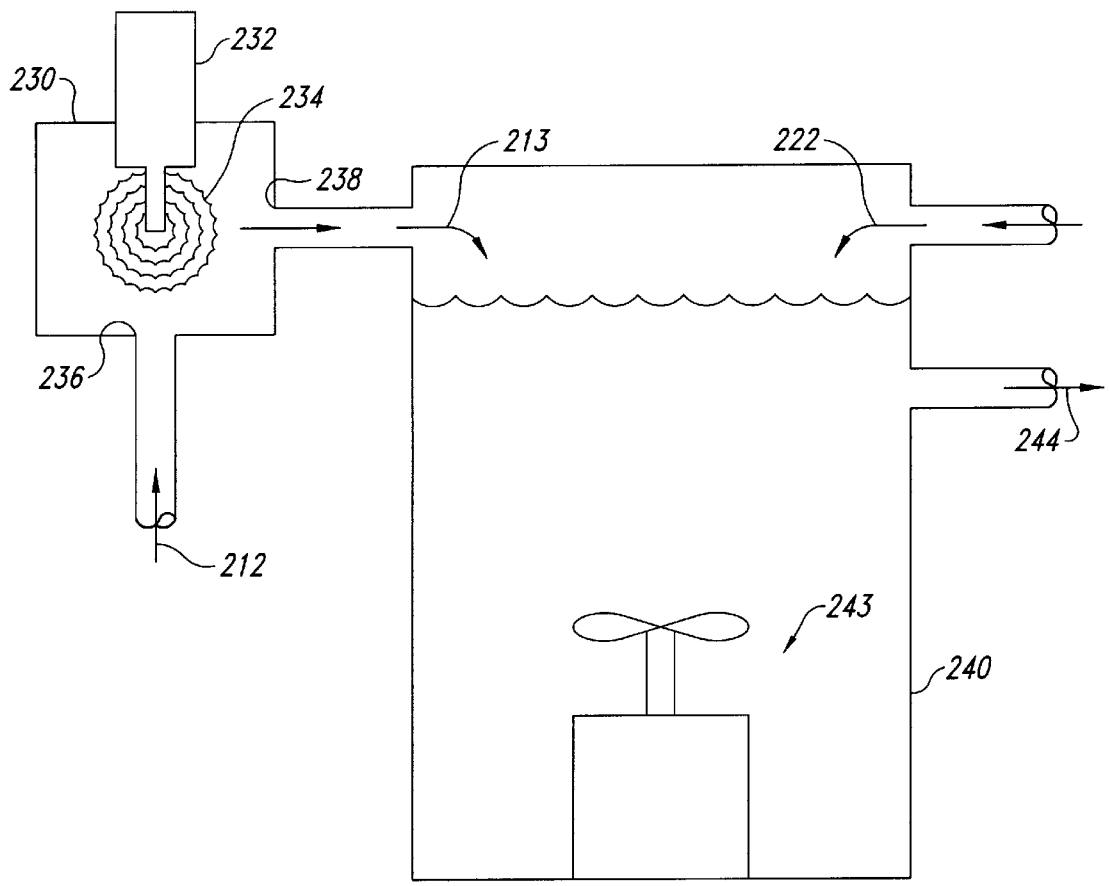
FIG. 3 is a schematic view of an energy source and mixing tank of a slurry manufacturing assembly in accordance with one embodiment of the invention.

FIG. 3 is a schematic view of an embodiment of the energy device 230 and the mixing tank 240 for use with the planarizing system 100 illustrated in FIG. 2. The energy device 230 is preferably a flow through sonicator having a sonic transducer 232 that generates an energy zone 234 in a flow of the first solution 212 from the first container 210 (FIG. 2). The energy device 230 can accordingly have a first port 236 coupled to the first container 210 and a second port 238 coupled to the mixing tank 240. The sonic energy generated by the sonic transducer 232 fractures or otherwise breaks apart abrasive elements to form a sonicated flow 213 having smaller abrasive elements and/or more unattached individual abrasive particles than the flow of the first solution 212 at the first port 236. The sonicated flow 213 of the first solution 212 accordingly flows into the mixing tank 240 through the second port 238 while a flow of the second solution 222 from the second container 220 (FIG. 2) separately flows into the mixing tank 240. The sonicated flow 213 and the second solution 222 are then mixed in the mixing tank 240 by an agitator 243 to form the mixed planarizing solution 244.

In one particular embodiment of the planarizing system 100, the energy device 230 has a chamber of approximately 50 ml and a sonic transducer 232 that operates at approximately 20 kHz with a power of 0.5–2 kW. In this embodiment, the flow rate of the first solution is approximately 25–300 ml/minute, and preferably approximately 100 ml/minute. The flow rate of the first solution 212 and the operating parameters of the sonic transducer can also be different than the values of this particular embodiment. The energy device, moreover, can also be a high turbulence pump (e.g., a pneumatic pump), a ball mill, or other suitable devices that can fracture the abrasive elements into smaller abrasive elements and/or individual abrasive particles.

Figure 4A:
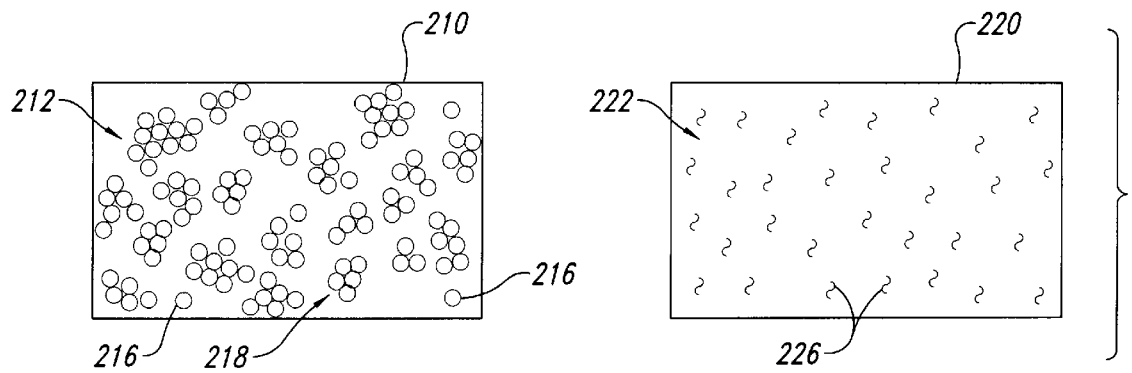
FIG. 4A is a schematic view illustrating first and second slurry components at one stage in a method for making a planarizing slurry in accordance with an embodiment of the invention.
Figure 4B:
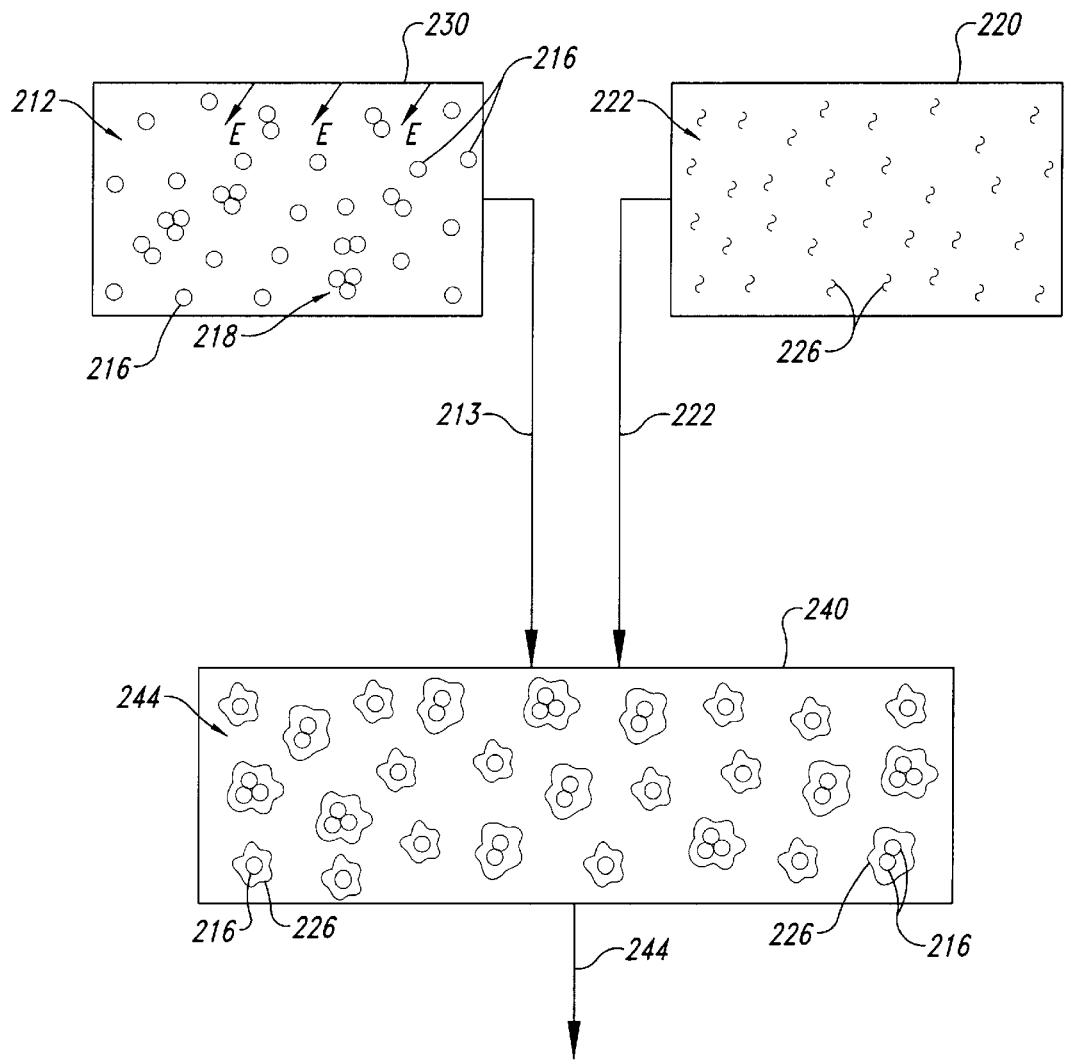
FIG. 4B illustrates the first and second slurry components of FIG. 4A at a subsequent stage of the method for making the planarizing slurry.

FIGS. 4A and 4B are schematic views illustrating various stages of making a planarizing slurry using the energy device 230 and the mixing tank 240. Referring to FIGS. 2 and 4A together, the first solution 212 in the first container 210 has a plurality of individual, free-floating abrasive particles 216 and a plurality of larger abrasive elements 218 formed from an agglomeration of individual abrasive particles. The second solution 222 in the second container 220 includes an agent that inhibits the agglomeration of abrasive particles, such as the dispersant 226. Referring to FIGS. 2 and 4B together, the energy device 230 imparts an energy E to the first solution 212 to break apart or otherwise fracture the abrasive elements 218 into smaller abrasive elements 218 and/or individual abrasive particles 216. The energized flow 213 of the first solution 212 from the energy device 230 and the flow of the second solution 222 from the second supply container 220 are mixed together in the mixing tank 240. The dispersing agent 226 from the second solution 222 covers or otherwise attaches to the individual abrasive particles 216 and the fractured abrasive elements 218 to inhibit the abrasive particles 216 and the fractured abrasive elements 218 from re-agglomerating. The mixed slurry 244 is then transferred to the substrate holder 32 (FIG. 2) to be deposited onto the polishing pad 40 (FIG. 2) for planarizing a substrate assembly.

Several embodiments of the slurry manufacturing system 200 and the methods for manufacturing the mixed slurry 244 produce planarizing slurries with small particle size distributions. One aspect of the methods set forth in FIGS. 2–4B is that the large abrasive elements 218 in the first container 210 are broken or fractured prior to mixing the first solution 212 with the dispersant 226 in the second solution 222. Compared to methods that sonicate the first and second solutions after mixing the solutions together to form the mixed slurry, fracturing the abrasive elements 218 prior to mixing the first and second solutions 212 and 222 together allows the energy imparted to only the first solution 212 to more readily fracture the abrasive elements 218 because they are not encapsulated by the dispersant 226. Moreover, the dispersant 226 inhibits the individual abrasive particles 216 and the fractured abrasive elements 218 from re-agglomerating prior to use with the planarizing machine 110. As such, many embodiments of the mixed slurry 244 flowing from the mixing tank 240 have a smaller particle size distribution than conventional slurries.

Figure 5A:
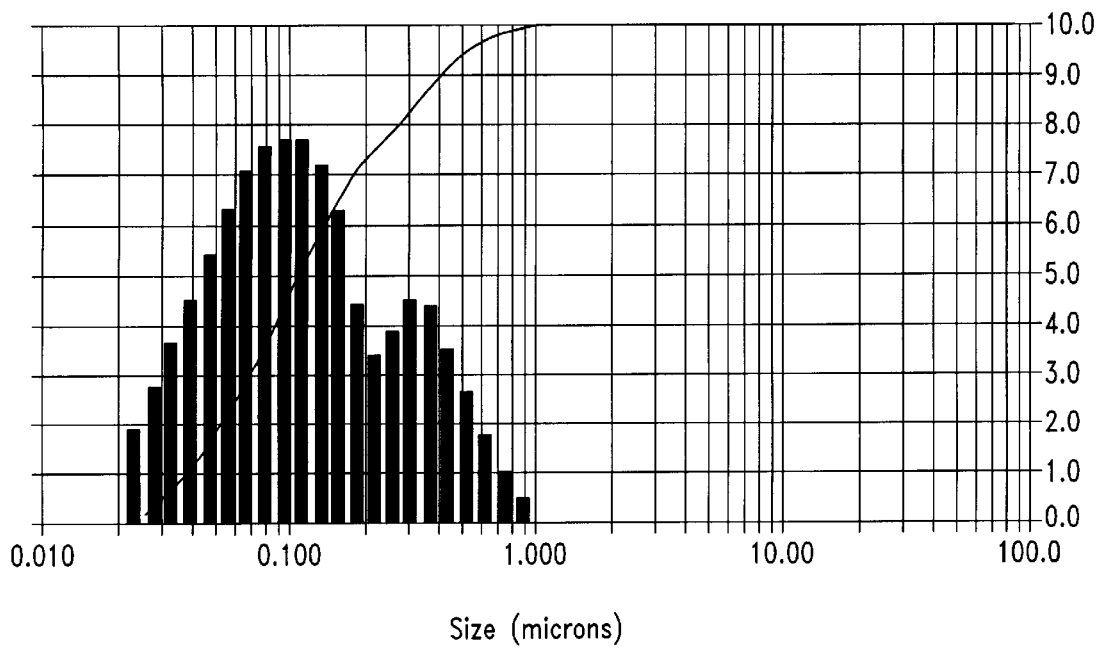
FIG. 5A is a bar graph illustrating a particle size distribution for a slurry made using a slurry manufacturing assembly and method in accordance with an embodiment of the invention.
Figure 5B:
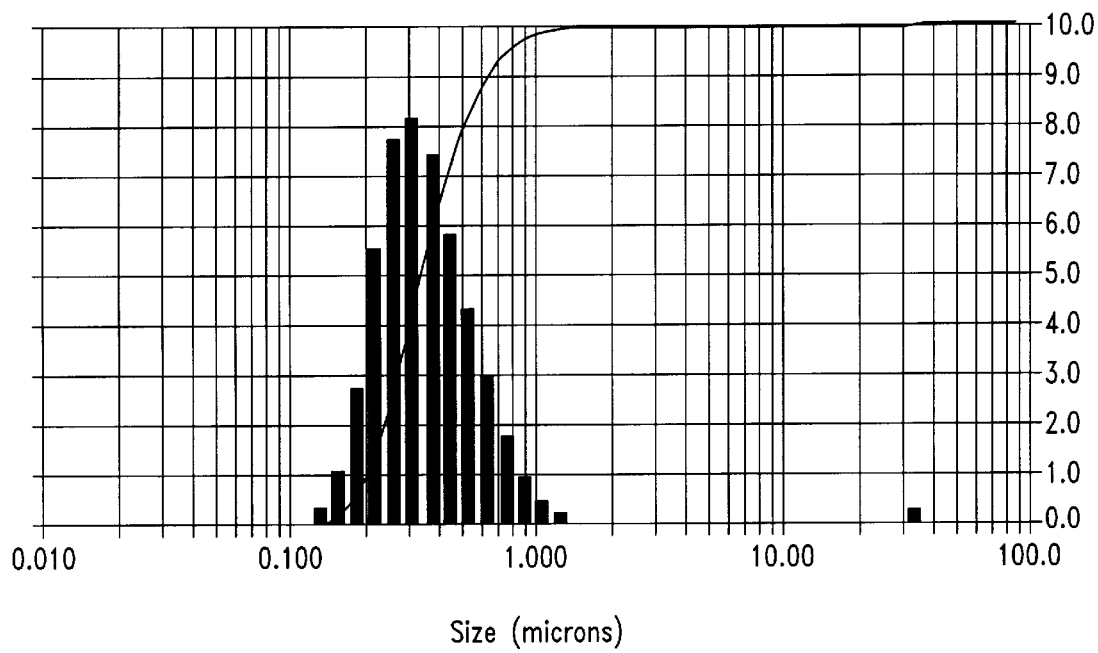
FIG. 5B is a bar graph of a particle size distribution for a slurry made using existing techniques.

FIG. 5A is a graph illustrating the particle size distribution for a slurry made using a method in accordance with an embodiment of the invention, and FIG. 5B is a graph illustrating the particle size distribution for a slurry made using an existing method. Referring to FIG. 5A, the particle size distribution of an embodiment of the planarizing slurry 244 is primarily between 0.02 and 0.14 $\mu$m. In contrast to the planarizing slurry 244, FIG. 5B illustrates that the particle size distribution of a planarizing slurry manufactured in accordance with conventional methods is primarily between 0.11 $\mu$m and 0.8 $\mu$m. The slurry manufacturing system 200 and the method of making the slurry 244 accordingly produce a planarizing slurry with a smaller particle size distribution than conventional manufacturing processes.

The particular embodiment of the planarizing system 200 and the method of manufacturing the planarizing slurry 244 described above with reference to FIGS. 2–4B also produce planarizing slurries with a consistent particle size distribution. Conventional processes for making the planarizing solution are plagued by inconsistent particle size distributions because the extent that the abrasive particles agglomerate in the first solution and the final mixed slurry can vary greatly from one batch of slurry to another. The slurry manufacturing system 200 and the methods for making the slurry 244 reduce variations in the particle size distribution because the abrasive elements 218 are subject to an energy source for a sufficient period of time to consistently reduce the number and size of the abrasive elements to within an acceptable range. Additionally, by coating the fractured abrasive elements 218 and the individual abrasive particles 216 with the dispersant 226 shortly before transporting the mixed slurry 244 to the planarizing machine 110, the abrasive particles 216 and the fractured abrasive elements 218 are significantly inhibited from re-agglomerating before the mixed slurry 244 is used to planarize a substrate. Thus, the manufacturing system 200 and the methods for manufacturing the planarizing slurry 244 provide consistent particle size distributions.

Referring again to FIG. 2, the substrate 12 is planarized by fabricating the mixed slurry 244 and then depositing the mixed slurry 244 onto the pad 40 via the nozzles 33. As the mixed slurry 244 covers the pad 40, the carrier assembly 30 presses the substrate 12 against the planarizing surface 42 of the pad 40 and translates the substrate 12 across the planarizing surface 42. Because the slurry manufacturing system 200 produces a consistent small particle size distribution in the planarizing slurry 244, the planarizing system 100 is expected to consistently produce highly planar and substantially defect free surfaces on the finished substrate assemblies 12.

From the foregoing it will be appreciated that, although specific embodiments of the invention have been described herein for purposes of illustration, various modifications may be made without deviating from the spirit and scope of the invention. For example, the methods and apparatuses described above with reference to FIGS. 2–4B can be used to manufacture planarizing slurries that do not have dispersants, or slurries that have agglomerations of different types of particles other than abrasive particles. Moreover, the flow of the second solution 222 can be introduced into the energized flow 213 of the first solution after the energy device 230 and before the mixing tank 240 such that a combined flow of the first and second solutions enters the mixing tank. Accordingly, the invention is not limited except as by the appended claims.

What is claimed is:

1. In the manufacturing of microelectronic devices, a method of making a planarizing slurry, the method comprising:

fracturing agglomerations of abrasive particles in a first solution comprising a liquid and the abrasive particles by imparting a mechanical energy to the first solution when the first solution is separate from a second solution, the first solution defining a first ingredient of a planarizing slurry and the second solution defining a second ingredient of the planarizing slurry, wherein the mechanical energy is applied at an intensity and for a period sufficient to fracture the agglomerations into smaller agglomerations or individual particles; and mixing the first solution with the second solution after fracturing the agglomerations of particles, the mixture of the first and second solutions forming the planarizing slurry.

2. The method of claim 1 wherein the liquid comprises water and the particles are abrasive particles, and wherein fracturing the agglomerations of particles comprises fracturing at least a portion of the agglomerations of abrasive particles.

3. The method of claim 2 wherein imparting an energy to the first solution to fracture at least a portion of the agglomerations of abrasive particles comprises emitting a sonic energy in the first solution.

4. The method of claim 2 wherein imparting an energy to the first solution to fracture at least a portion of the agglomerations of abrasive particles comprises emitting a sonic energy in the first solution at a power of 2 kW and a frequency of 20 kHz.

5. The method of claim 2 wherein imparting an energy to the first solution to fracture at least a portion of the agglomerations of abrasive particles comprises emitting sonic energy at a power of 2 kW and a frequency of 20 kHz in a flow of the first solution having a flow rate of 50–250 ml/min.

6. The method of claim 2 wherein imparting an energy to the first solution to fracture at least a portion of the agglomerations of abrasive particles comprises milling the first solution using a ball mill.

7. The method of claim 2 wherein imparting an energy to the first solution to fracture at least a portion of the agglomerations of abrasive particles comprises pumping the first solution using a pneumatic pump.

8. The method of claim 2 wherein the abrasive particles comprise ceria particles having a particles size of approximately 0.01 $\mu$m to 1.0 $\mu$m and the second solution comprises a liquid and a dispersant, and wherein:

imparting an energy to the first solution to fracture at least a portion of the agglomerations of abrasive particles comprises emitting sonic energy at a power of 2 kW and a frequency of 20 kHz in a flow of the first solution having a flow rate of 50–250 ml/min; and the method further comprises inhibiting re-agglomeration of the abrasive particles by attaching the dispersant to the fractured agglomerations of abrasive particles and individual abrasive particles in the act of mixing the first and second solutions.

9. In the manufacturing of microelectronic devices, a method of making a planarizing slurry, the method comprising:

fracturing agglomerations of particles in a first solution comprising a liquid and the particles by imparting energy to the first solution, the agglomerations being fractured into smaller agglomerations or individual particles, wherein the liquid comprises water and the particles are abrasive particles, and wherein fracturing the agglomerations of particles comprises fracturing at least a portion of the agglomerations of abrasive particles; and mixing the first solution with a second solution after fracturing the agglomerations of particles, the mixture of the first and second solutions forming the planarizing slurry; and inhibiting re-agglomeration of the abrasive particles after mixing the first and second solutions.

10. In the manufacturing of microelectronic devices, a method of making a planarizing slurry, the method comprising:

fracturing agglomerations of particles in a first solution comprising a liquid and the particles by imparting energy to the first solution, the agglomerations being fractured into smaller agglomerations or individual particles, wherein the liquid comprises water and the particles are abrasive particles, and wherein fracturing the agglomerations of particles comprises fracturing at least a portion of the agglomerations of abrasive particles; and mixing the first solution with a second solution after fracturing the agglomerations of particles, the mixture of the first and second solutions forming the planarizing slurry; and inhibiting re-agglomeration of the abrasive particles after mixing the first and second solutions, wherein the second solution comprises a dispersant and a liquid, and wherein inhibiting re-agglomeration of the abrasive particles comprises attaching the dispersant to the fractured agglomerations of abrasive particles and individual abrasive particles in the act of mixing the first and second solutions.

11. In the manufacturing of microelectronic devices, a method of making a planarizing slurry, the method comprising:

imparting sonic energy to a first slurry component comprising a liquid and a plurality of abrasive particles when the first slurry component is separate from a second slurry component; and mixing the first slurry component with the second slurry component after imparting the sonic energy to the first slurry component, the mixture of the first and second slurry components forming a slurry mixture.

12. The method of claim 11 wherein imparting sonic energy to the first slurry component comprises emitting a sonic energy in the first slurry component at a power of 2 kW and a frequency of 20 kHz.

13. The method of claim 11 wherein the first slurry component comprises a liquid and ceria abrasive particles having a particles size of approximately 0.01 $\mu$m to 1.0 $\mu$m, and the second slurry component comprises a liquid and a dispersant, and wherein:

imparting sonic energy to the first slurry component comprises emitting sonic energy at a power of 2 kW and a frequency of 20 kHz in a flow of the first slurry component having a flow rate of 50–250 ml/min; and the method further comprises inhibiting re-agglomeration of the abrasive particles by attaching the dispersant to the fractured agglomerations of abrasive particles and individual abrasive particles in the act of mixing the first and second slurry components.

14. The method of claim 11, further comprising inhibiting re-agglomeration of the abrasive particles after mixing the first and second slurry components.

15. The method of claim 14 wherein the second slurry component comprises a dispersant and a liquid, and wherein inhibiting re-agglomeration of the abrasive particles comprises attaching the dispersant to the fractured agglomerations of abrasive particles and individual abrasive particles in the act of mixing the first and second slurry components.

16. In the manufacturing of microelectronic devices, a method of making a planarizing slurry, the method comprising:

providing a first solution comprising water and a plurality of abrasive particles dispersed in the water, at least a portion of the abrasive particles being agglomerated together forming larger abrasive elements;

breaking apart at least a portion of the abrasive elements into smaller abrasive elements or individual abrasive particles;

providing a second solution comprising a fluid and a dispersing agent in the fluid separate from the first solution, the dispersing agent being selected to inhibit the abrasive particles from agglomerating with one another; and mixing the first solution with a second solution after breaking apart at least a portion of the abrasive elements.

17. The method of claim 16 wherein breaking apart at least a portion of the abrasive elements comprises imparting an energy to the first solution.

18. The method of claim 16 wherein breaking apart at least a portion of the abrasive elements comprises emitting a sonic energy in a flow of the first solution at a power of 2 kW and a frequency of 20 kHz.

19. The method of claim 16 wherein breaking apart at least a portion of the abrasive elements comprises emitting sonic energy at a power of 2 kW and a frequency of 20 kHz in a flow of the first solution having a flow rate of 50–250 ml/min.

20. The method of claim 16 wherein breaking apart at least a portion of the abrasive elements comprises milling the first solution using a ball mill.

21. The method of claim 16 wherein breaking apart at least a portion of the abrasive elements comprises pumping the first solution using a pneumatic pump.

22. The method of claim 16 wherein the abrasive particles comprise ceria particles having a particles size of approximately 0.01 $\mu$m to 1.0 $\mu$m, and wherein:

breaking apart at least a portion of the abrasive elements comprises emitting sonic energy at a power of 2 kW and a frequency of 20 kHz in a flow of the first solution having a flow rate of 50–250 ml/min; and the method further comprises inhibiting re-agglomeration of the abrasive elements and the abrasive particles by attaching the dispersant to the fractured abrasive elements and the individual abrasive particles in the act of mixing the first and second solutions.

23. The method of claim 16 wherein the abrasive particles comprise at least one of ceria particles, tantalum oxide particles, silicon dioxide particles or alumina particles, and wherein breaking apart the abrasive elements comprises vibrating the first solution.

24. The method of claim 16, further comprising inhibiting re-agglomeration of the abrasive elements and the abrasive particles after mixing the first and second solutions.

25. The method of claim 24, further comprising inhibiting re-agglomeration of the abrasive elements and the abrasive particles by attaching the dispersant to the fractured abrasive elements and individual abrasive particles in the act of mixing the first and second solutions.

26. In the manufacturing of microelectronic devices, a method of planarizing a microelectronic-device substrate assembly, the method comprising:

fabricating a planarizing slurry by fracturing agglomerations of abrasive particles in a first slurry component and mixing the first slurry component with a second slurry after fracturing the agglomerations of abrasive particles to form a mixed slurry;

dispensing the mixed slurry onto a planarizing surface of a planarizing pad; and removing material from the substrate assembly by pressing the substrate assembly against the planarizing surface and moving at least one of the substrate assembly and the planarizing pad.

27. The method of claim 26 wherein fracturing the agglomerations of abrasive particles comprises imparting sonic energy to the first slurry component by emitting a sonic energy at a power of 2 kW and a frequency of 20 kHz.

28. The method of claim 26 wherein the first slurry component comprises a liquid and ceria abrasive particles having a particles size of approximately 0.01 $\mu$m to 1.0 $\mu$m, and the second slurry component comprises a liquid and a dispersant, and wherein:

fracturing the agglomerations of abrasive particles comprises emitting sonic energy at a power of 2 kW and a frequency of 20 kHz in a flow of the first slurry component having a flow rate of 50–250 ml/min; and the method further comprises inhibiting re-agglomeration of the abrasive particles by attaching the dispersant to the fractured agglomerations of abrasive particles and individual abrasive particles in the act of mixing the first and second slurry components.

29. The method of claim 26, further comprising inhibiting re-agglomeration of the abrasive particles after mixing the first and second slurry components.

30. The method of claim 29 wherein the second slurry component comprises a dispersant and a liquid, and wherein inhibiting re-agglomeration of the abrasive particles comprises attaching the dispersant to the fractured agglomerations of abrasive particles and individual abrasive particles in the act of mixing the first and second slurry components.

31. In the manufacturing of microelectronic devices, a method of planarizing a microelectronic-device substrate assembly, the method comprising:

fabricating a planarizing slurry by breaking apart at least a portion of a plurality of abrasive elements in a first solution, the abrasive elements comprising a plurality of abrasive particles, and mixing the first solution with a second solution after breaking apart the portion of the abrasive elements, the second solution comprising at least one chemical in addition to the abrasive elements of the first solution;

dispensing the slurry onto a planarizing surface of a planarizing pad; and removing material from the substrate assembly by pressing the substrate assembly against the planarizing surface and moving at least one of the substrate assembly and the planarizing pad.

32. The method of claim 31 wherein breaking apart at least a portion of the abrasive elements comprises imparting an energy to the first solution.

33. The method of claim 31 wherein breaking apart at least a portion of the abrasive elements comprises emitting a sonic energy at a power of 2 kW and a frequency of 20 kHz in a flow of the first solution.

34. The method of claim 31, further comprising inhibiting re-agglomeration of the abrasive elements and the abrasive particles after mixing the first and second solutions.

35. The method of claim 31 wherein the second solution comprises a dispersant and a liquid, and wherein inhibiting re-agglomeration of the abrasive elements and the abrasive particles comprises attaching the dispersant to the fractured abrasive elements and individual abrasive particles in the act of mixing the first and second solutions.

36. In the manufacturing of microelectronic devices, a method of planarizing a microelectronic-device substrate assembly, the method comprising:

providing a first solution comprising water and a plurality of abrasive particles dispersed in the water in which at least a portion of the abrasive particles are agglomerated into larger abrasive elements;

breaking apart at least a portion of the abrasive elements to reduce an average size of the abrasive elements;

providing a second solution comprising a fluid and a dispersing agent in the fluid, the dispersing agent inhibiting the abrasive particles from agglomerating with one another;

mixing the first solution with a second solution after breaking apart at least a portion of the abrasive elements to form a planarizing slurry;

dispensing the slurry onto a planarizing surface of a planarizing pad; and removing material from the substrate assembly by pressing the substrate assembly against the planarizing surface and moving at least one of the substrate assembly and the planarizing pad.

* * * * *